H. MURCH.
Mop-Head.
No. 2,958. Reissued June 2, 1868
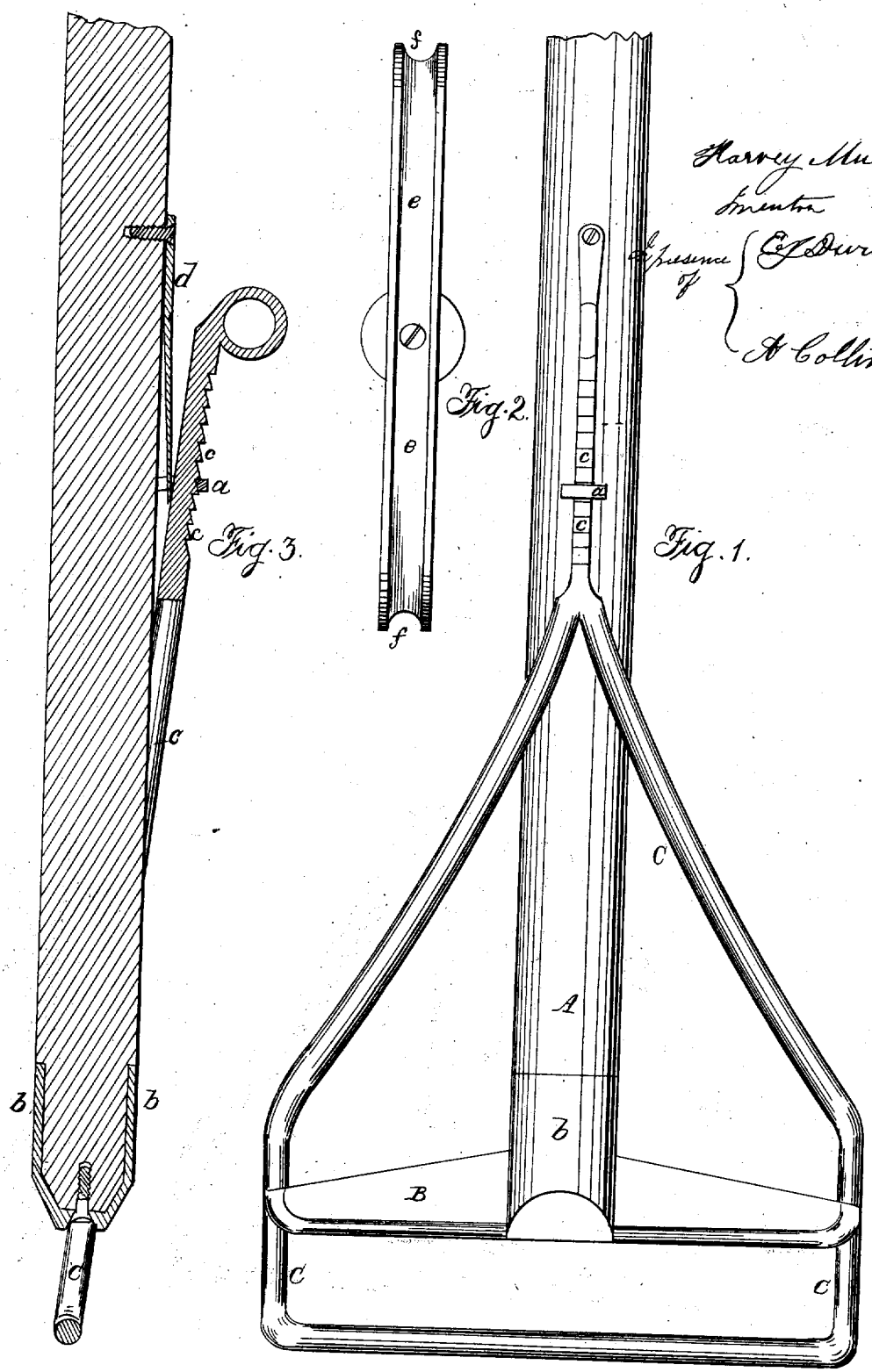
N. PETERS, PHOTO-LITHOGRAPHER, WASHINGTON, D. C.

United States Patent Office.

COLBY BROTHERS AND COMPANY, OF WATERBURY, VERMONT, ASSIGNEES, BY MESNE ASSIGNMENTS, OF HARVEY MURCH.

*Letters Patent No.* 9,781, *dated June* 14, 1853; *extended seven years; reissue No.* 2,958, *dated June* 2, 1868.

DIVISION B.

IMPROVED MOP-HEAD.

The Schedule referred to in these Letters Patent and making part of the same.

TO ALL WHOM IT MAY CONCERN:

Be it known that I, HARVEY MURCH, of Lebanon, in the county of Grafton, and State of New Hampshire, have invented a new and useful Improvement in Mop-Heads; and that the following, taken in connection with the accompanying drawings, is a full, clear, and exact description thereof.

In the drawings, which represent a mop-head and handle made according to the principles of my invention—

Figure 1 is a plan of the whole,

Figure 2 an end view of the cross-head, and

Figure 3 a longitudinal section through the whole contrivance.

Prior to the date of my invention mop-heads have been made with cross-heads and binders, the latter capable of motion towards and away from the former, and provided with nuts, acting on screw-threads upon the binders.

I prefer to use in my mop-head a cross-head, to which a socket is attached, or made in one piece therewith, and a binder, the fastening of which, for holding it so as to clamp rags, fibres, &c., forming the mop, is secured to the handle of the mop; and in my mop-head as represented in the drawings, the handle is shown at A, the cross-head at B, the socket thereof driven on to the handle at *b*, and the binder at C. The cross-head I prefer to make with grooves at its ends *f f*, and on its face as at *c c*, and I prefer to unite the two ends of the binder, and to locate the fastening thereof, for holding it in such position as to clamp the articles composing the mop, upon the handle; such location of the fastening causing those parts of the binder extending from the ends of the cross-head to the handle to act as guys or braces when the articles composing the mop are clamped fast. These braces serve to hold the cross-head firm and fast even after the handle becomes loosened in the socket. The fastening for the binder consists of a staple-catch, *a*, through which the end of the binder passes, and a spring, *d*, acting in conjunction with notches *e e* upon the binder. This contrivance permits the binder to be drawn towards or shoved away from the cross-head, and serves also to hold the binder fast in such position as to clamp rags, &c., between the cross-head and the binder, and also prevents any great extent of lateral motion of the end of the binder. This whole contrivance I term a ratchet-fastening.

I claim, as of my own invention—

1. The combination, with a cross-head and binder, of a ratchet-fastening, the combination being substantially as described.

2. The combination of a ratchet-fastening, handle, binder, and cross-head, the combination being substantially such as set forth.

HARVEY MURCH.

Witnesses:

E. J. DURANT,

A. COLLINS.